US012731145B2

(12) United States Patent
Shoup et al.

(10) Patent No.: US 12,731,145 B2
(45) **Date of Patent: *Sep. 8, 2026**

(54) IMAGE-BASED AUTHORIZATION SYSTEMS

(71) Applicant: Capital One Services, LLC, McLean, VA (US)

(72) Inventors: Elizabeth M. Shoup, Mechanicsville, VA (US); Caroline Harriott, Richmond, VA (US); Imani Holmes, Richmond, VA (US); Joshua Edwards, Philadelphia, PA (US); Yingli Sieh, Cambridge, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/822,927

(22) Filed: Sep. 3, 2024

(65) Prior Publication Data

US 2024/0428249 A1 Dec. 26, 2024

Related U.S. Application Data

(63) Continuation of application No. 17/888,970, filed on Aug. 16, 2022, now Pat. No. 12,112,329.

(51) Int. Cl.
*G06Q 20/40* (2012.01)
*G06Q 20/38* (2012.01)
*G06V 20/50* (2022.01)

(52) U.S. Cl.
CPC ....... *G06Q 20/4015* (2020.05); *G06Q 20/382* (2013.01); *G06Q 20/4016* (2013.01); *G06Q 20/405* (2013.01); *G06V 20/50* (2022.01)

(58) Field of Classification Search
CPC .. G06Q 20/4015; G06Q 20/382; G06Q 20/18; G06Q 20/20; G06Q 20/204;
(Continued)

(56) References Cited

U.S. PATENT DOCUMENTS 10,373,150 B2 8/2019 Aaron et al.
11,049,157 B2 6/2021 Isaacson et al.
(Continued)

FOREIGN PATENT DOCUMENTS

WO 2021011136 A1 1/2021

OTHER PUBLICATIONS

"[HTML] Technical feasibility of context-aware passive payment authorization for physical points of sale" A. Wojtowicz, J. Chmielewski—Personal and Ubiquitous Computing, 2017—Springer (Year 2017).

*Primary Examiner* — Eric T Wong
(74) *Attorney, Agent, or Firm* — Banner & Witcoff, Ltd.

(57) ABSTRACT

Aspects described herein may allow transactions to be authenticated based on images taken at the transaction site. For example, a computing device may decline a transaction request based on a first category of the transaction indicated in the category information violates a transaction category restriction of the user account. The computing device may send, to a user device associated with the user account, an instruction to upload one or more photos that depict a physical environment where the transaction is requested. If the photos indicate the requested transaction belongs to another category that does not violate the transaction category restriction, the system may approve the transaction based on the photos.

18 Claims, 6 Drawing Sheets

(58) Field of Classification Search
CPC .. G06Q 20/32; G06Q 20/4016; G06Q 20/405; G06T 7/70; G06T 2207/20081; G06V 20/50; G06V 2201/07; G06V 10/764; G06V 20/10
See application file for complete search history.

(56) References Cited

U.S. PATENT DOCUMENTS

| | | | | |
|---|---|---|---|---|
| 11,436,588 | B1 * | 9/2022 | Roth | G06Q 30/0185 |
| 12,112,329 | B2 * | 10/2024 | Shoup | G06Q 20/20 |
| 2013/0024307 | A1 | 1/2013 | Fuerstenberg et al. | |
| 2015/0120551 | A1 | 4/2015 | Jung et al. | |
| 2017/0046758 | A1 * | 2/2017 | Sheehan | G06Q 20/10 |
| 2017/0295177 | A1 * | 10/2017 | Huang | G06V 40/20 |
| 2017/0357981 | A1 | 12/2017 | Azzam et al. | |
| 2018/0039989 | A1 * | 2/2018 | Beye | G06Q 30/0601 |
| 2018/0309801 | A1 | 10/2018 | Rathod | |
| 2019/0370802 | A1 | 12/2019 | Bennett et al. | |
| 2020/0118137 | A1 | 4/2020 | Sood et al. | |
| 2020/0302519 | A1 | 9/2020 | Van Os et al. | |
| 2023/0047509 | A1 | 2/2023 | Dhodapkar | |
| 2023/0252470 | A1 | 8/2023 | Dhodapkar | |
| 2024/0028678 | A1 * | 1/2024 | Albero | G06Q 20/40 |

* cited by examiner

IMAGE-BASED AUTHORIZATION SYSTEMS

CROSS REFERENCE TO RELATED APPLICATIONS

This application claims priority to U.S. application Ser. No. 17/888,970, filed Aug. 16, 2022, and entitled "Image-Based Authorization Systems," which is herein incorporated by reference in its entirety.

FIELD OF USE

Aspects of the disclosure relate generally to data processing. More specifically, aspects of the disclosure may provide for systems and methods for authorizing transactions using image processing technology.

BACKGROUND

When an account holder delegates, to an authorized user, the authority to use a financial card account, the account holder may want to set restrictions on such delegation, and those restrictions might be used by an authentication system to permit and/or prohibit certain forms of transactions. For example, an employer may authorize an employee to use a financial card only at gas stations or hotels in order to facilitate the employee's business trip, such that transactions conducted at point-of-sale systems corresponding to gas stations and/or hotels are permitted by the authentication system, but all other transactions are denied. Similarly, a parent may delegate, to a child, the authority to use a financial card account everywhere except for entertainment facilities, such that transactions conducted at point-of-sale systems corresponding to entertainment facilities are denied by the authentication system, but all other transactions are permitted. Stated differently, with such transaction category restrictions, a transaction request made by the authorized user using the financial card may be declined if the financial card authorization system determines the requested transaction belongs to a category that is outside the scope of the authorization. Sometimes, transaction requests that are within the scope of the delegation may be mistakenly declined if the transaction is mistakenly categorized. For example, a gas station may purchase a new point of sale system, and that point of sale system might not be properly associated with the gas station (because, e.g., the point of sale system uses an incorrect merchant category code). In turn, if the employee in the example above tried to conduct a transaction at the gas station using the new point of sale system, the authentication system might improperly deny that transaction. A mistakenly declined transaction may bring inconveniences for the card user and detrimentally affect the user experience.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

When a user makes a transaction request using a user account that is subject to a transaction category restriction (e.g., a restriction that prohibits the account to be used in transactions of certain categories), the request may be declined by an authorization system if the transaction belongs to a category that violates the restriction. The authorization system associated with the user account may rely on category indications (e.g., a merchant category code, "MCC") that are preset by a merchant to determine the transaction category. For example, a gas station owner may register a point of sale system connected with a gas dispenser under the category of gas stations, and the registered category indication may be obtained by the authorization system to determine whether a transaction should be approved or not. However, if the category indication is mistakenly registered, transactions that do not violate the transaction category restriction may still be declined. Such mistake declination may cause inconvenience to the user, especially in a card-present transaction where the user has fewer alternate options to pay for the transaction.

To overcome limitations in the prior art described above, and to overcome other limitations that will be apparent upon reading and understanding the present specification, aspects described herein are directed towards authorizing previously-denied transactions based on one or more photos taken on the transaction site. If a transaction is declined because the transaction violates a transaction category restriction, the user may take photos of the physical environment of the transaction site and upload the photos to the authorization system that declines the transaction. In this manner, if the user believes the violation is improper (e.g., because a point-of-sale system is mistakenly categorized), the user is able to prove, through photos, the category to which the merchant should belong, and in turn, may prove that the transaction should have been granted. The authorization system may approve the transaction based on determining that the photos indicate that the transaction actually belongs to a category that does not violate the restriction.

Aspects discussed herein may provide a computer-implemented method for authorizing transactions. In at least one embodiment, a computing device may receive, from a second computing device, a request, associated with a user account, to approve a transaction. The computing device may determine that the user account is subject to a transaction category restriction, and may determine, based on a category indication associated with the request, that the transaction belongs to a first category. The computing device may decline, based on a determination that approving a transaction of the first category violates the transaction category restriction, the request. The computing device may send, after the request is declined and to a user device associated with the user account, an instruction to upload one or more photos that depict a physical environment where the transaction is requested. If the computing device receives, from the user device, the one or more photos, the computing device may process, using one or more object recognition algorithms, the one or more photos to identify one or more objects in the physical environment where the transaction is requested, and may determine, based on comparing the one or more objects to one or more reference objects associated with a second category, that the transaction belongs to the second category. The second category may be different from the first category. The computing device may approve, based on a determination that approving a transaction of the second category does not violate the transaction category restriction, the transaction. The second computing device may comprise a smart card reader or a point of sale (POS) device.

In some instances, the instruction may comprise a second request to take the one or more photos within a time range after the instruction is sent. The processing the one or more photos may be based on determining that the one or more photos were received within the time range.

In some instances, the one or more photos each depict the physical environment from a different perspective. The processing the one or more photos to identify the one or more objects may comprise identifying a first object based on different perspectives of the object.

In some instances, the computing device may further receive, from the user device, authentication information associated with the one or more photos, and may authenticate, based on the authentication information, that the one or more photos depict the physical environment where the transaction is requested. The authentication information may comprise at least one of: a timestamp associated with a time when the one or more photos are taken, or location information of the user device when the one or more photos are taken.

In some instances, the computing device may further train, using training data comprising a plurality of photos depicting a plurality of photos at different times of day, a machine learning model to output, in response to an input photo, a prediction of a time of day when the input photo was taken; provide, to the trained machine learning model, the one or more photos; and receive, as output from the trained machine learning model, a prediction of one or more times of day when the one or more photos were taken. The processing the one or more photos may be based on determining that the one or more times of day satisfy a threshold.

In some instances, the category indication may comprise a merchant category code (MCC) or a North American Industry Classification System (NAICS) code associated with the physical environment.

In some instances, the computing device may further update, based on the determination that the transaction belongs to the second category, category information of a merchant associated with the transaction.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
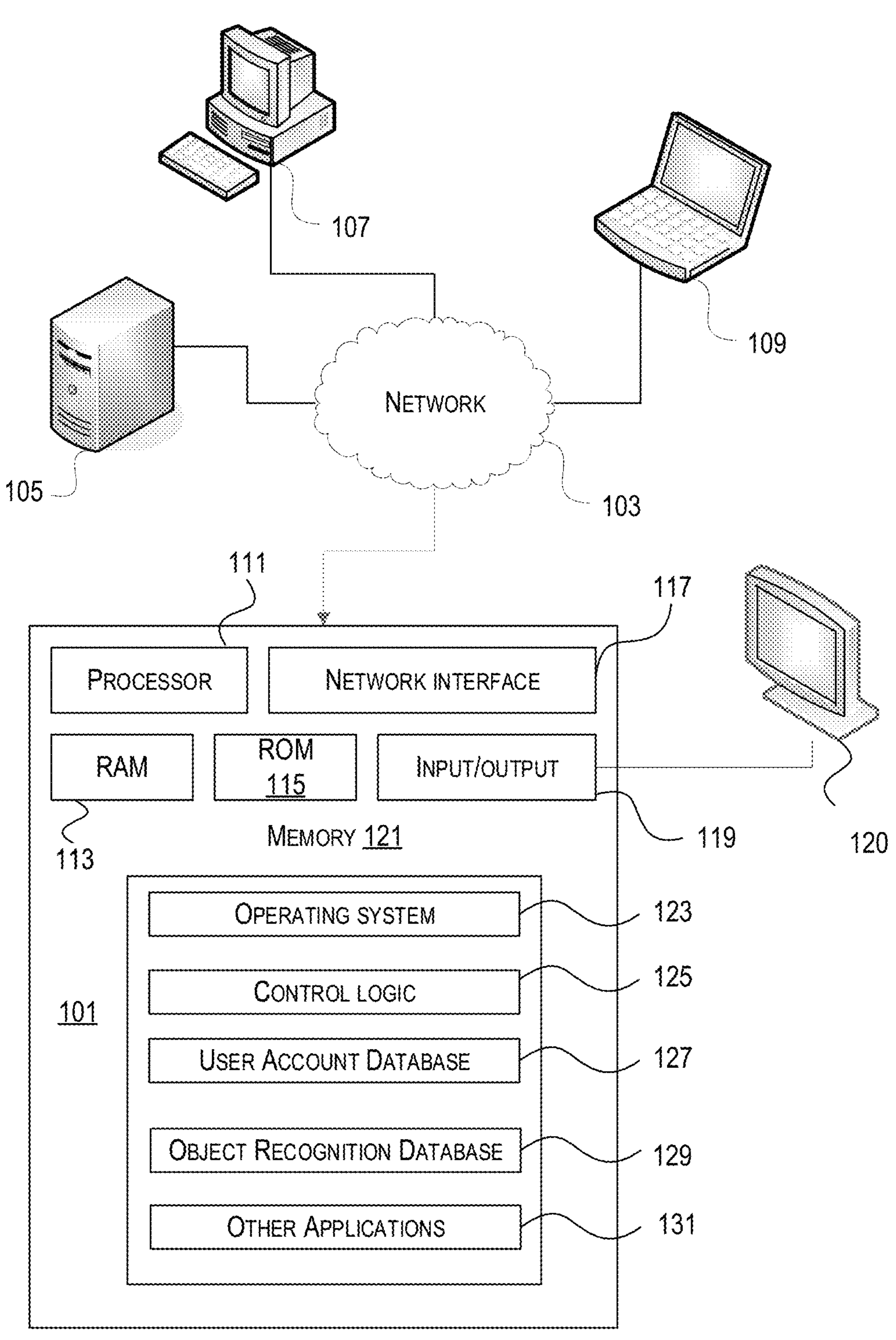
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

When a user makes a transaction request using a user account that is subject to a transaction category restriction, the request may be declined by an authorization system if the transaction belongs to a category that violates the restriction. For example, if a user has an user account that is authorized to make purchase only at gas stations or hotels, a request to pay for a grocery store purchase by this user account may be declined by the authorization system. Sometimes, transaction requests that are within the scope of the delegation may be mistakenly declined if the transaction is mistakenly categorized. For example, a gas station may purchase a new point of sale system, and that point of sale system might not be properly associated with the gas station (because, e.g., the point of sale system uses an incorrect merchant category code). In turn, if the user tries to conduct a transaction at the gas station using the new point of sale system, the authentication system might improperly deny that transaction. Such mistake declination may cause inconvenience to the user, especially in a card-present transaction where the user has fewer alternate options to pay for the transaction. To overcome limitations in the prior art described above, and to overcome other limitations that will be apparent upon reading and understanding the present specification, aspects described herein are directed towards authorizing transactions based on one or more photos taken on the transaction site. If a transaction is declined because the transaction violates a transaction category restriction, the user may take photos of the physical environment of the transaction site and upload the photos to the authorization system that declines the transaction. In this manner, if the user believes the violation is improper (e.g., because a point-of-sale system is mistakenly categorized), the user is able to prove, through photos, the category to which the merchant should belong, and in turn may prove that the transaction should have been granted. The authorization system may approve the transaction based on determining that the photos indicate that the transaction actually belongs to a category that does not violate the restriction.

By way of introduction, aspects discussed herein may relate to systems, methods, techniques, apparatuses, and non-transitory computer-readable media for authorizing transactions based on one or more photos taken on the transaction site.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading or executing instructions and performing one or more actions based on the instructions. In some embodiments, computing device 101 may represent, be incorporated in, or include various devices such as a desktop computer, a computer server, a user device (e.g., a laptop computer, a tablet computer, a smartphone, any other type of mobile computing devices, and the like), or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109, and other devices (not shown) may be connected to one or more of the networks via twisted pair wires, coaxial cable, fiber optics, radio waves, or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), or other processing units such as a processor adapted to perform computations associating converting information, routing copies of messages, or other functions described herein. I/O 119 may include a variety of interface units and drives for reading, writing, displaying, or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling the overall operation of the computing device 101, control logic 125 for instructing computing device 101 to perform aspects discussed herein. Furthermore, memory 121 may store various databases and applications depending on the particular use, for example, user account database 127, object recognition database 129, and other applications 131 may be stored in a memory of a computing device used at a server system that will be described further below. Control logic 125 may be incorporated in or may comprise a linking engine that updates, receives, or associates various information stored in the memory 121. In other embodiments, computing device 101 may include two or more of any or all of these components (e.g., two or more processors, two or more memories, etc.) or other components or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, devices 101, 105, 107, 109, and others may operate in concert to provide parallel computing features in support of the operation of control logic 125.

One or more aspects discussed herein may be embodied in computer-usable or readable data or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer-executable instructions may be stored on a computer-readable medium such as a hard disk, optical disk, removable storage media, solid-state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field-programmable gate arrays (FPGA), and the like. Particular data structures may be used to more effectively implement one or more aspects discussed herein, and such data structures are contemplated within the scope of computer-executable instructions and computer-usable data described herein. Various aspects discussed herein may be embodied as a method, a computing device, a data processing system, or a computer program product.

The data transferred to and from various computing devices may include secure and sensitive data, such as confidential documents, customer personally identifiable information, and account data. Therefore, it may be desirable to protect transmissions of such data using secure network protocols and encryption, or to protect the integrity of the data when stored on the various computing devices. A file-based integration scheme or a service-based integration scheme may be utilized for transmitting data between the various computing devices. Data may be transmitted using various network communication protocols. Secure data transmission protocols or encryption may be used in file transfers to protect the integrity of the data such as, but not limited to, File Transfer Protocol (FTP), Secure File Transfer Protocol (SFTP), or Pretty Good Privacy (PGP) encryption. In many embodiments, one or more web services may be implemented within the various computing devices. Web services may be accessed by authorized external devices and customers to support input, extraction, and manipulation of data between the various computing devices. Web services built to support a personalized display system may be cross-domain or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, or firewalls. Such specialized hardware may be installed and configured in front of one or more computing devices such that any external devices may communicate directly with the specialized hardware.

Figure 2:
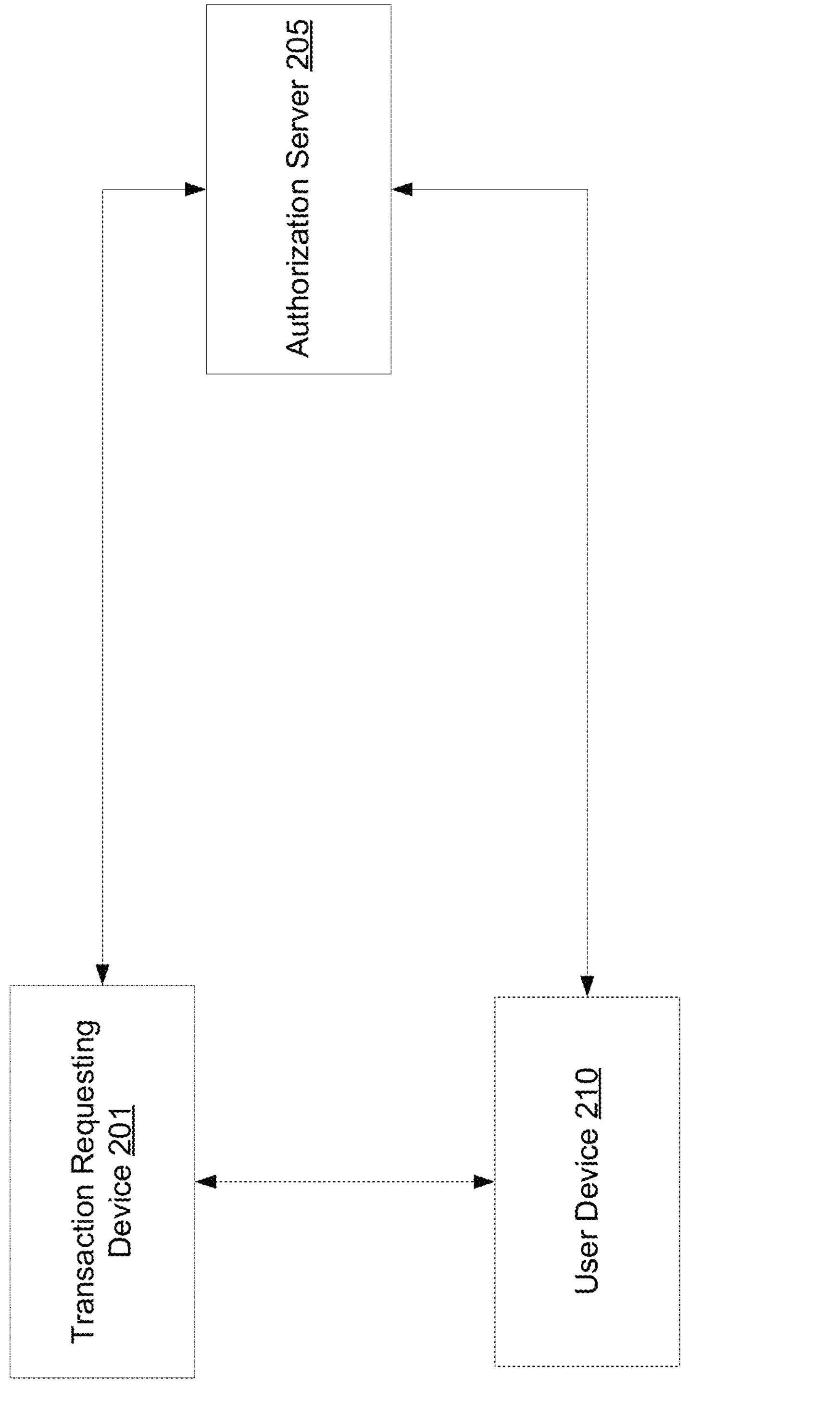
FIG. 2 depicts an example computing environment in accordance with one or more illustrative aspects discussed herein.

FIG. 2 depicts an illustrative computing environment for authorizing transactions in accordance with one or more example embodiments. Referring to FIG. 2, computing environment 200 may include a transaction requesting device 201, an authorization server 205, and a user device 210. Each of the transaction requesting device 201, authorization server 205, and the user device 210 may comprise one or more computing devices 101 as shown in FIG. 1.

The transaction requesting device 201 may be a computing device that is configured to receive and/or transmit a request for a transaction. For example, the transaction requesting device 201 may comprise a point of sale (POS) device. Additionally and/or alternatively, the transaction requesting device 201 may comprise a smart card reader, a barcode reader, or any software or hardware module configured to obtain information about a user account. The transaction requesting device 201 may receive and/or transmit a request for a transaction based on user interaction with the transaction requesting device 201. For example, the user might swipe a financial card into a card reader of the transaction requesting device 201, may tap the financial card next to the transaction requesting device 201 (and thereby transmit information wirelessly), may enter financial account details into a user input field provided in a user interface of the transaction requesting device 201, or the like. In some cases, the transaction requesting device 201 may comprise all or portions of a website. For example, the transaction requesting device 201 may comprise a server that provides a shopping website, and a user may, using the user device 210, browse the website provided by the transaction requesting device 201 and transmit financial credentials through an entry field provided in the website. Additionally and/or alternatively, the transaction requesting device 201 may be operated by the user who requests the transaction. For example, the transaction requesting device 201 may be a user device (e.g., a mobile phone, a tablet, a smartwatch, etc.) that is configured to obtain the merchant's information and/or the transaction information (e.g., merchant identification, transaction amount, etc.) by an input interface. For example, the user device may comprise a camera that can detect a barcode provided by the merchant.

The transaction requesting device 201 may send a transaction request to the authorization server 205 to have the transaction approved. The transaction request may comprise the information about the user account. The transaction request may additionally and/or alternatively comprise information about the transaction (e.g., the amount of money involved in the transaction, a timestamp when the transaction is requested, and/or the identification of the merchant in the transaction).

The transaction request may also include a category indication of the transaction request. For example, the category indication may comprise a merchant category code (MCC) or a North American Industry Classification System (NAICS) code. The category indication may be preset by the merchant and may be configured to identify the nature of the merchant or the transaction. For example, the category indication may indicate the transaction request is associated with a purchase at a grocery store, at a gas station, or at an airplane ticket agent.

The authorization server 205 may be configured to determine whether the transaction request should be approved or not. For example, the user account may be a bank account, and the authorization server 205 may be a server that manages the bank account. The determination as to whether a transaction is to be approved may be based on a variety of criteria. For example, if any restriction is preset to the user account, the determination may be based on whether the transaction violates the preset restriction. Restrictions may be associated with a budget amount that the user is authorized to spend, a geographical scope where the user is authorized to use the user account, or other types of limitations. One type of restriction that is frequently imposed on a user account is transaction category restrictions. A user account that is subject to a transaction category restriction may be a user account that is only authorized to make transactions of certain categories, and is not authorized to make transactions of other categories. For example, a parent may provide a child a financial card but set a transaction category restriction, preventing the card from being used at any entertainment facilities. In another example, an employer may provide an employee with a value-storage card that is only authorized to purchase hotels or gas stations. The authorization server 205 may determine whether the requested transaction belongs to a category that the user account is authorized to be used. A preliminary decision of the transaction category may be made based on the category indication that is sent from the transaction requesting device 201 or otherwise obtained based on an identification of the merchant. However, sometimes the category indication may be mistakenly set and/or might otherwise be inaccurate. For example, a smartcard reader that is connected with a gas dispenser may be mistakenly marked as a grocery store. If an employee fills up gas at such a mistakenly marked gas dispenser and makes a transaction request to pay for the gas, and if the user account is authorized to purchase at gas stations but not grocery stores, the transaction request may be declined. Such declination may cause inconvenience to the user and therefore detrimentally affect user experience.

As discussed below in greater detail, if the authorization server 205 determines that the requested transaction is outside the authorization scope of the user account, the authorization server 205 may send, to the user device 210, an instruction to send one or more photos that depict the transaction site in order to correct the mistakenly categorized transaction and get the transaction request approved. The one or more photos may be taken by a user device 210. The user device 210 may be any computing device associated with the user who requests the transaction, and may comprise or be communicatively connected with a camera. For example, the user device 210 may be a mobile phone, a tablet, a smartwatch, or other devices. The user device 210 may receive instructions to take photos, take the photos, and send the photos back to the authorization server 205. If the authorization server 205 determines that the photos establish that the requested transaction belongs to a category within the authorization scope, the authorization server 205 may approve the transaction and/or update the category information associated with the merchant.

The transaction requesting device 201, the authorization server 205, and the user device 210 may be separate physical devices. The communication between the transaction requesting device 201, the authorization server 205, and the user device 210 may be via a network (e.g., network 103 as described in FIG. 1). Alternatively or additionally, some or all of the transaction requesting device 201, authorization server 205, or the user device 210 may be located in the same physical device. For example, some or all modules of the authorization server 205 may be located on the transaction requesting device 201 or the user device 210. In the example where a user device is used to request the transaction, as discussed above, the transaction requesting device 201 may be the same physical device as the user device 210.

Figure 3A:
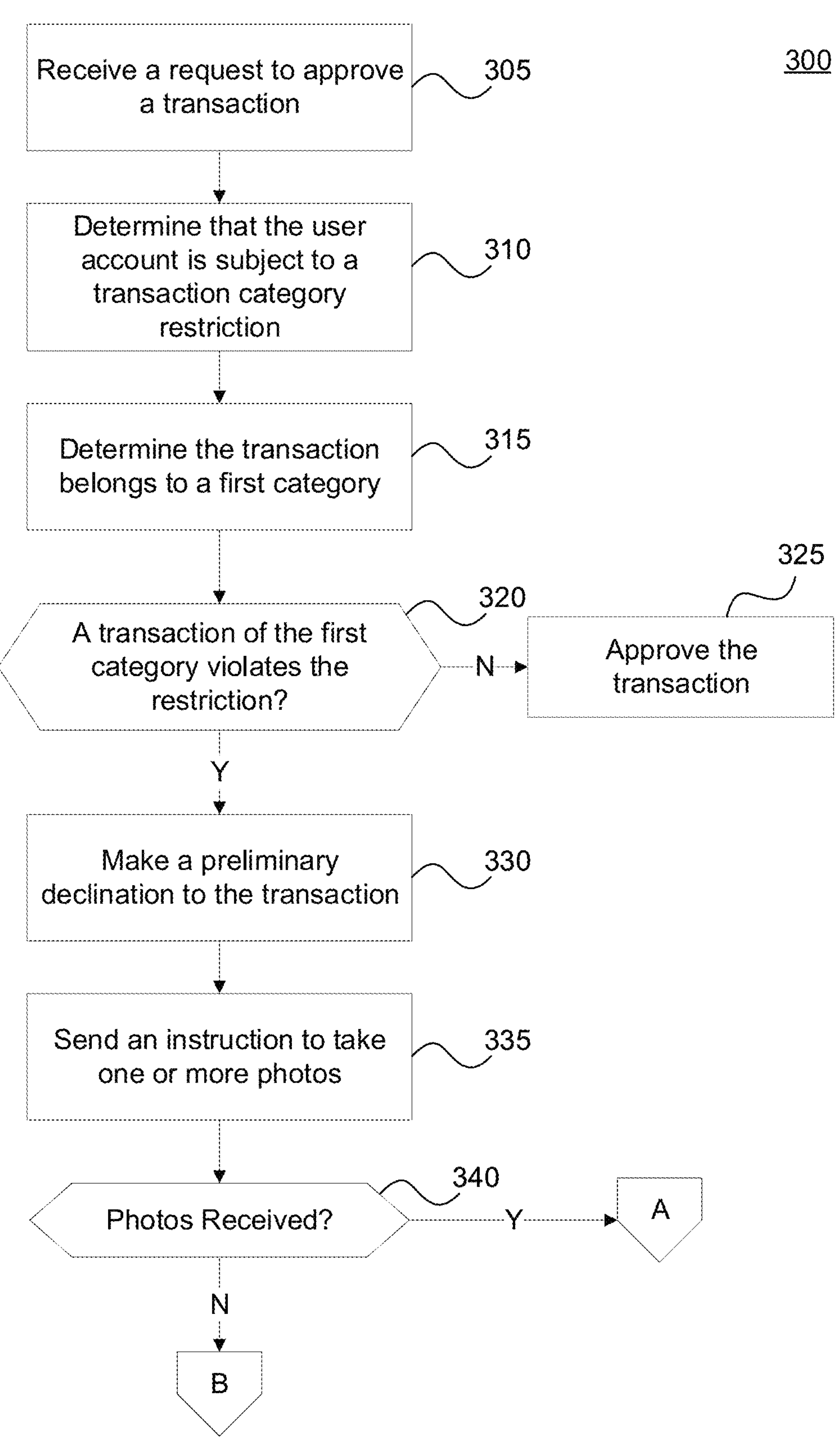
FIGS. 3A and 3B is a flow diagram of an example method for authorizing transactions in accordance with one or more illustrative aspects discussed herein.
Figure 3B:
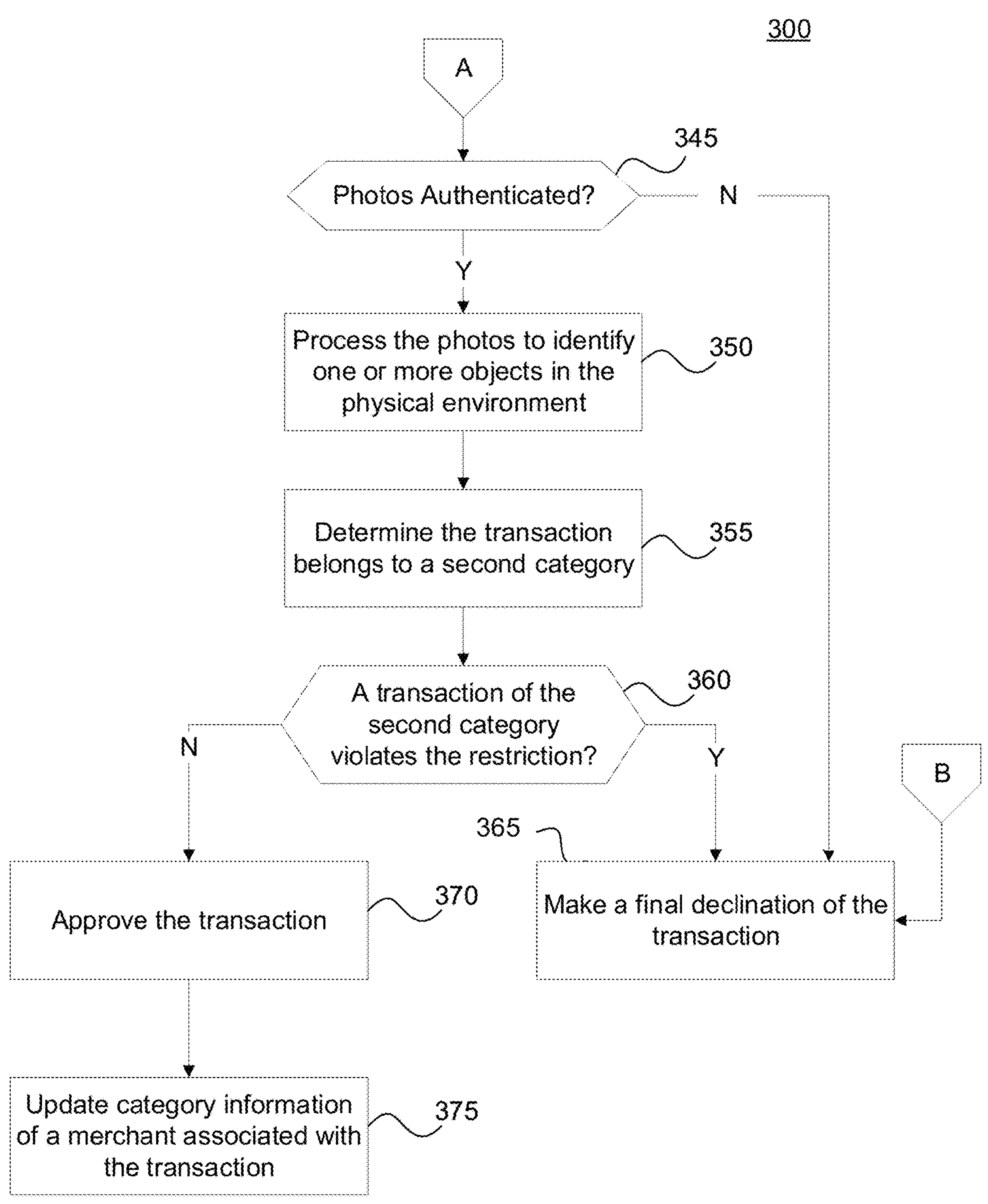

FIG. 3 is a flow diagram depicting a method 300 for authorizing transactions in accordance with one or more illustrative aspects discussed herein. The steps in method 300 may be performed by a system comprising, for example, the authorization server 205 shown in FIG. 2. A computing device may comprise one or more processors and memory storing instructions that, when executed by the one or more processors, cause the performance of one or more of the steps of FIG. 3. One or more non-transitory computer-readable media may store instructions that, when executed by one or more processors, cause performance of one or more of the steps of FIG. 3.

At step 305, the system may receive, from a second computing device (e.g., a transaction requesting device such as the transaction requesting device 201 as shown in FIG. 2), a request to approve a transaction. The transaction may be associated with a user account. For example, the requested transaction may be a payment to a gas station. The user account may be a bank account. The user may hold a bank card that is linked to the user account and may swipe the card through a card reader connected with a gas dispenser at the gas station. The transaction request may be a request to transfer a certain amount of money from the user account to a merchant account associated with the gas dispenser.

At step 310, the system may determine that the user account is subject to a transaction category restriction. The transaction category restriction may limit the category of transactions that the user account is authorized to make. The transaction category may be determined based on the identity of the merchant in the transaction. As discussed above, the transaction category restriction may be set by an employer of the user and the user account may be authorized to make purchases only at gas stations or hotels to facilitate the employee's business travel. Determining that the user account is subject to a transaction category restriction may comprise querying a database using information corresponding to the user account. For example, a unique identifier of a user account may be used to query a transaction category database to determine whether the database indicates one or more transaction category restrictions.

At step 315, the system may determine, based on a category indication associated with the request, that the transaction belongs to a first category. The category indication may indicate the type of merchant, or the type of product or service the merchant sells. For example, the category indication may comprise a merchant category code (MCC) or a North American Industry Classification System (NAICS) code. For example, the MCC code of a gas station may be 5541. The category indication may be preset and/or otherwise established by the merchant. The category indication may be sent by the transaction requesting device 201 together with the transaction request, or may be otherwise obtained by the system based on the transaction request (e.g., an identification of the merchant included in the transaction request).

At step 320, the system may determine whether approving a transaction of the first category violates the transaction category restriction. If the first category is outside the scope that the user account is authorized to be used, the system may determine that approving such a transaction violates the transaction category restriction. For example, if a user is authorized to make a purchase only at gas stations or hotels, approving a transaction request to pay for a grocery store purchase may violate the transaction category restriction. If the system determines that approving a transaction of the first category does not violate the transaction category restriction, the method may proceed to step 325. If the system determines that approving a transaction of the first category violates the transaction category restriction, the method may proceed to step 330.

At step 325, the system may approve the transaction. The system may allow the amount of money or other credits stipulated in the transaction request to be transferred from the user account to an account associated with the merchant in the transaction.

At step 330, the system may make a preliminary declination to the transaction based on determining that the user is not authorized to make a transaction of the first category. That said, as indicated above, this preliminary declination might be improper. For example, the category indication may be mistakenly set, and therefore may not accurately reflect the transaction category of the requested transaction. In such a circumstance, the declination might be based on the incorrect category. For example, a smartcard reader connected with a gas dispenser may be mistakenly categorized as a grocery store. If that happens, an authorized purchase at a gas station may be mistakenly declined. As discussed below, in order to provide the user a convenient opportunity to correct the mistakenly marked category and get an authorized transaction approved, the system may provide the user instructions to overcome the preliminary declination.

At step 335, the system may send, after the request is preliminarily declined, one or more instructions to take one or more photos that depict a physical environment where the transaction is requested. The instructions may be sent to a user device associated with the user account (e.g., user device 210 as shown in FIG. 2). For example, the user device may execute a dedicated mobile application that is managed by the system and the mobile application may be logged in using the information of the user account. The instructions may be sent as a push notification to the mobile application that instructs a user of the user device to take one or more photos. In another example, the user may link the user account with an email address or a phone number, and the user device may receive the instructions via an email notification or a text message.

The system may send the one or more instructions based on receiving, from the user device 210, an indication that the user disputes the preliminary declination. The system may send, to the user device 210, a notification (e.g., a text message) indicating the preliminary declination. In turn, the user may provide some form of response to the notification. For example, if the notification is a text message, the user might respond with another text message that disputes the preliminary declination. In this circumstance, the system may then send the one or more instructions.

The one or more instructions may cause the user device 210 to take one or more photos. For example, the one or more instructions may comprise data that, when received by the user device, cause the user device 210 to execute a camera application and take, at one or more intervals, photos of the environment of the user device 210. It may be desirable for such instructions to cause the photo application to take pictures because this may add a degree of security: for example, it may ensure that the photos are recent, rather than older photos.

Figure 4B:
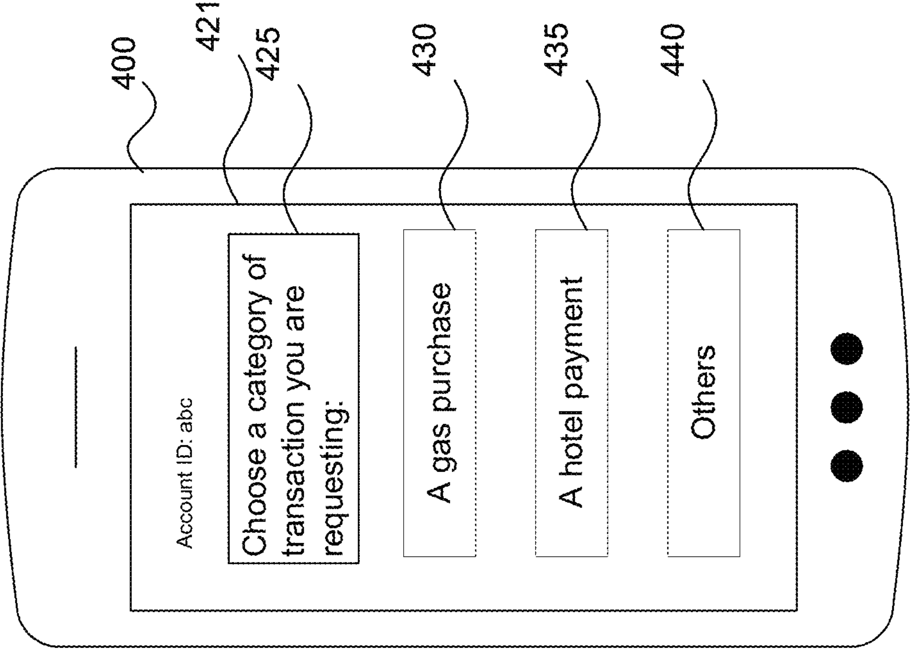
FIG. 4B depicts another example user interface in accordance with one or more illustrative aspects discussed herein.
Figure 4A:
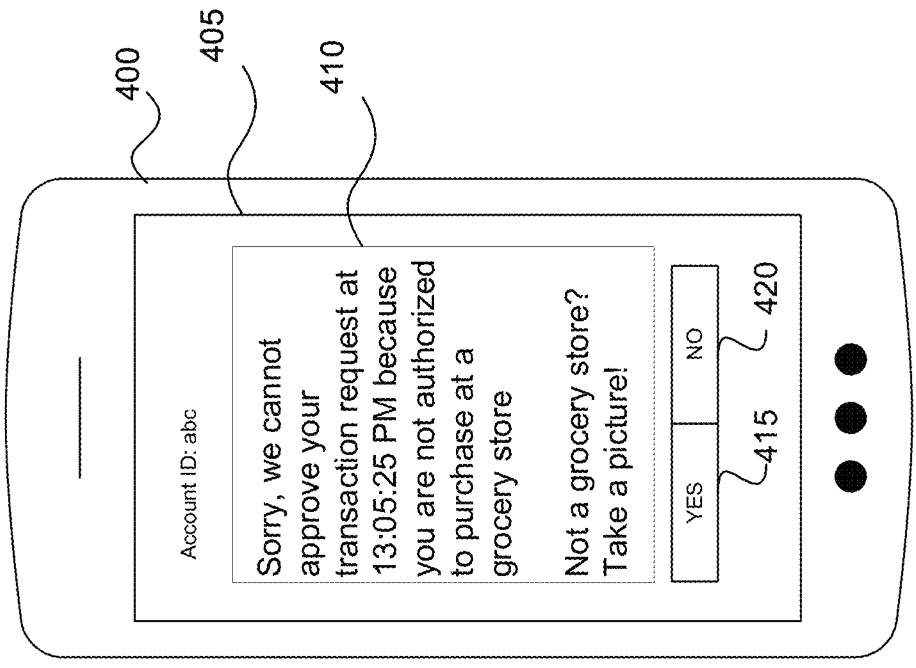
FIG. 4A depicts an example user interface in accordance with one or more illustrative aspects discussed herein.

FIGS. 4A-4D show exemplary user interfaces of a user device 400 associated with the user account. FIGS. 4A-4D may show the interaction between the user device and the authorization server after the transaction is preliminarily declined. As shown in FIG. 4A, the user device 400 displays a user interface 405. Consistent with the above example where a transaction request is declined due to the gas dispenser is mistakenly marked as a grocery store, the user interface 405 may display a dialog window 410 that states: "Sorry, we cannot approve your transaction request at 13:05:25 PM because you are not authorized to purchase at a grocery store. Not at a grocery store? Take a picture!" A "Yes" button 415 and a "No" button 420 may be displayed under the dialog window 410. The user may express the willingness to take pictures by pressing the "Yes" button 415. The user may choose not to take the pictures by pressing the "No" button 420 or simply ignoring the dialog window 410.

FIG. 4B may show the user interface 421 after the user presses the "Yes" button 415 in FIG. 4A. The user interface 421 may display a couple of user-selectable options regarding the transaction category the user believes the transaction belongs to. For example, as shown in FIG. 4B, a dialog window 425 may indicate "choose a category of transaction you are requesting." Below the dialog window 425, a couple of user-selectable options may be displayed. For example, an option button 430 may correspond to "a gas purchase," an option button 435 may correspond to "a hotel payment," and an option button 440 may correspond to "other category." The user-selectable options may be particularly helpful if the user account is authorized to make transactions under multiple categories, as different types of photos may be requested based on the alleged transaction category.

Figure 4D:
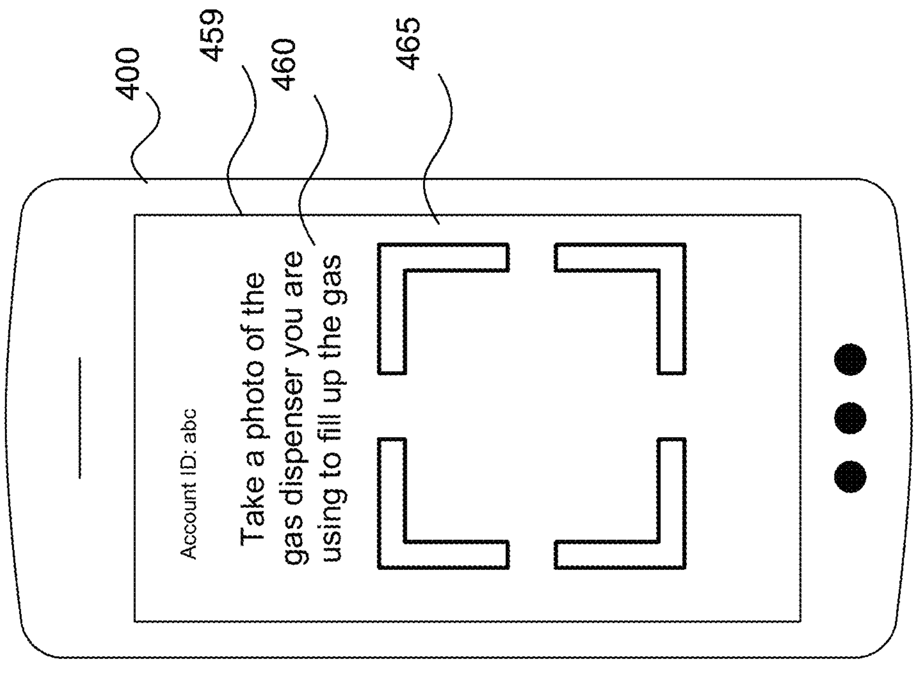
FIG. 4D depicts another example user interface in accordance with one or more illustrative aspects discussed herein.
Figure 4C:
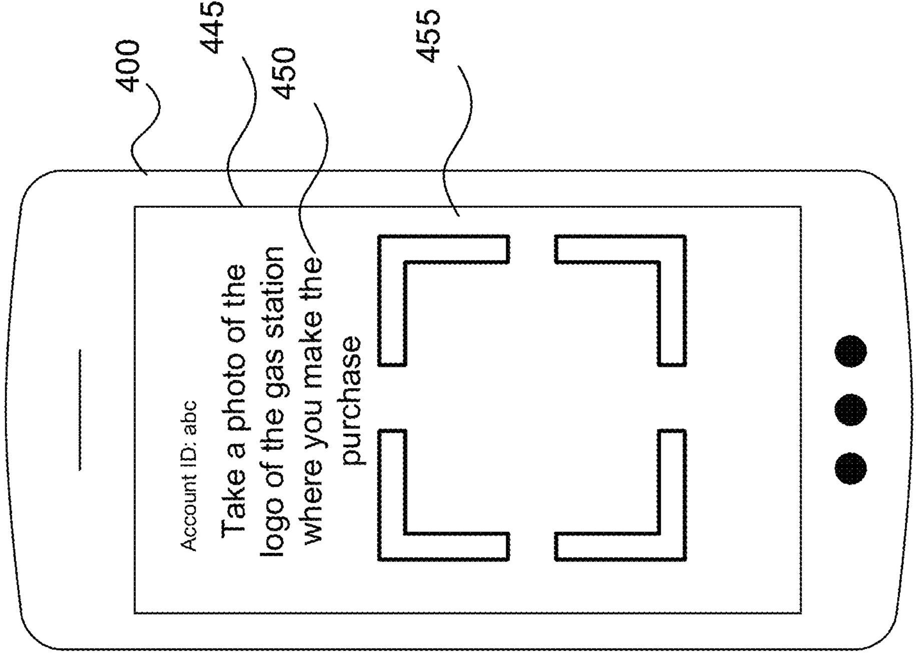
FIG. 4C depicts another example user interface in accordance with one or more illustrative aspects discussed herein.

FIG. 4C may show the user interface 445 after the user presses "a gas purchase" button 430 as shown in FIG. 4B. As shown in FIG. 4C, an instruction 450 that states "take a photo of the logo of the gas station where you make the purchase" may be displayed above a window 455. A camera of the user device 400 may be turned on and the user device 400 may capture an image of the gas station logo. The view of the logo may be within window 455 when the image is captured. The user device 400 may upload the photo to the system.

The system may instruct the user to take more than one photo. For example, FIG. 4D may show a user interface 459 being displayed after the user uploads the photo requested in FIG. 4C. As shown in FIG. 4D, an instruction 460 that states "take a photo of the gas dispenser you were using to fill up the gas" may be displayed above a window 465. A camera of the user device 400 may be turned on and the user device 400 may capture an image of the gas dispenser. The view of the gas dispenser may be within window 465 when the image is captured. The user device 400 may upload the photo to the system.

It is appreciated that FIGS. 4A-4D are merely examples, and other notifications or instructions may be displayed. For example, the instructions may comprise additional requirements that the one or more photos should comply with. The instructions may request the one or more photos be taken within a time range after the instructions are sent. The instructions may request that the one or more photos each depict the physical environment from a different perspective. As may be discussed below, the additional requirements may be helpful for the system to authenticate the one or more photos (e.g., to establish that the one or more photos are likely to be taken at the location where the user requests the transaction, instead of somewhere else). Such authentication may help prevent some users from circumventing the transaction category restrictions by uploading photos that do not describe the physical environment of the transaction site.

At step 340, the system may determine whether the one or more photos are received. For example, the system may determine whether the one or more photos were received within a predetermined time period. If the system does not receive the one or more photos within a predetermined time period, the method may proceed to step 365 to make a final declination of the transaction. If the system receives the one or more photos within the predetermined time period, the method may proceed to step 345. The predetermined time period may be a time period that is provided in the instructions in step 335, or the predetermined time period may be any other time period preset within the system (e.g., five minutes).

At step 345, the system may authenticate, based on the authentication information, that the one or more photos depict the physical environment where the transaction is requested. As part of authenticating the one or more photos, the system may confirm that the authentication information was received from the user device that uploads the photos. This may be helpful to prevent the user from circumventing the transaction category restriction (e.g., by downloading one or more photos from the Internet and pretending the user requests the transaction on the location where the downloaded photos depict). For example, the system may process the metadata of the one or more photos to determine a likelihood that the one or more photos were taken in the physical environment and within a time period corresponding to the one or more instructions in step 335. As another example, the system may compare the one or more photos to one or more second photos on the Internet to determine whether the one or more photos accurately represent the physical location but are not identical to the one or more second photos. In that manner, the system might not only determine that the one or more photos are accurate, but that the one or more photos were taken by the user (instead of, e.g., downloaded from the Internet).

Various types of authentication information may be used by the system. For example, the authentication information may comprise one or more timestamps each associated with a time when a photo is taken. If the one or more photos are taken via a dedicated mobile application, the timestamps may be collected by the mobile application when the mobile application instructs the camera to capture each of the photos. If the one or more photos are taken via a general camera application that the system does not manage, the system may request a timestamp recorded by the camera application to be sent together with the photo. The system may determine whether the timestamp indicates a time within a predetermined time range (e.g., 5 minutes) after the instructions to take the photos are sent to the user device. The system may authenticate the one or more photos if the timestamp indicates a time within the time range.

In another example, the authentication information may comprise the location information that indicates the location of the user device when the one or more photos are taken. For example, the location information may be a Global Positioning System (GPS) indicator that indicates the current location of the user device when the photos are taken or uploaded. The system may determine whether the user device is located at or near a location corresponding to the type of physical environment the one or more photos depict. For example, if the one or more photos depict a gas station, the system may authenticate the one or more photos if the current location of the user device is at or in the proximity of (e.g., no more than 0.1 miles away from) a gas station.

The one or more photos themselves may also be used as authentication information to authenticate the photos. For example, if the instructions include first instructions to take multiple photos, each depicting the physical environment from a different perspective, the one or more photos may be authenticated based on the perspective in each photo complies with the first instruction. For example, the instructions may include taking one photo of the gas station's logo from the left side, and another photo of the gas station's logo from the right side. The system may authenticate the two photos to determine if the perspectives of the logo in the two photos comply with the first instructions. This may be helpful because a user who wants to circumvent the transaction category restriction may have difficulties in finding multiple photos from other sources (e.g., the Internet) that comply with the first instructions.

Machine learning technology may also be used to authenticate the one or more photos. For example, the system may input the one or more photos into a machine learning model to predict the time of the day, the date, or other information regarding when the one or more photos were taken. For example, photos taken during the morning may be darker than photos taken at noon. The system may authenticate the one or more photos to determine if the time of the day predicted by the machine learning model matches the time of the day when the transaction request is made. In another example, photos taken on a sunny day may be brighter than photos taken on a rainy day. The system may authenticate the one or more photos to determine if the weather condition of the day when the transaction request is made matches the weather condition predicted by the machine learning model. The weather condition information may be obtained from a third party database. The machine learning model may be trained using training data comprising a plurality of photos depicting a plurality of photos at different times of day (or different weather conditions) to output, in response to an input photo, a prediction of a time of day (or a weather condition) when the input photo was taken. The system may provide, to the trained machine learning model, the one or more photos received from the user device. The system may receive, as output from the trained machine learning model, a prediction of one or more times of day (or weather conditions) when the one or more photos were taken. If the one or more times of day satisfy a threshold, the system may determine that the one or more photos are authenticated.

It is appreciated that the type of authentication information and authentication methods are merely examples, and other types of authentication information or authentication methods may be used. The system may also use a combination of multiple types of authentication information. Each of the multiple types of authentication information may be weighted to determine whether the one or more photos are authenticated.

If the system authenticates the one or more photos, the method may proceed to step 350. If the system is unable to authenticate the one or more photos, the method may proceed to step 365 to make a final declination of the transaction.

At step 350, the system may process, using one or more object recognition algorithms, the one or more photos to identify one or more objects in the physical environment where the transaction is requested. Consistent with the example in FIGS. 4A-4D, if a photo of the gas station logo and a photo of the gas dispenser were sent to the system, the system may identify the logo and the dispenser on each of the photos respectively. As discussed above, if the system instructs the one or more photos each depict the physical environment from a different perspective, the processing the one or more photos to identify the one or more objects may comprise identifying a first object based on different perspectives of the object.

At step 355, the system may determine, based on comparing the one or more objects to one or more reference objects associated with a second category, that the transaction belongs to the second category. The one or more reference objects may be stored in a database. The second category may be different from the first category. Consistent with the example in FIGS. 4A-4D, the system may compare the gas station logo identified from the photo with a plurality of reference gas station logos, and if the gas station logo identified from the photo matches any of the reference gas station logos, the system may determine the transaction is a gas station purchase, instead of a grocery store purchase.

The system may communicate with a database that stores a mapping between transaction categories and reference objects. For example, a plurality of transaction categories may be stored in the database. Each transaction category may be mapped with a plurality of reference objects. The plurality of reference objects that are mapped to a transaction category may be objects that are typically seen at a transaction site associated with the transaction category. For example, a reference object image of a gas dispenser may be mapped with a gas station, since a gas dispenser may be typically seen at a gas station.

Each of the plurality of reference objects that are mapped with a particular transaction category may be assigned to a score. A higher score may indicate the reference object is more likely to be seen at the transaction site of that category. A lower score may indicate the reference object is less likely to be seen at a transaction site of that category. For example, a gas dispenser may be mapped with a gas station and may be assigned a higher score (e.g., a score of 10) since it is almost certain that a gas dispenser is located at a gas station and only located at a gas station. In another example, a revolving door may be mapped with a hotel but may be assigned a lower score (e.g., a score of 3) since, although a revolving door may be a typical object at the entry of a hotel, the revolving door may also be found somewhere else (e.g., an entry of a shopping mall).

The system may calculate a total score or average score corresponding to each transaction category based on all the objects recognized from the one or more photos. If the system determines that the total score or average score corresponding to a second transaction category exceeds a threshold, the system may determine the transaction belongs to the second transaction category.

At step 360, the system may determine whether approving a transaction of the second category violates the transaction category restriction. For example, if the second category is a gas station purchase and the category is authorized, the system may determine approving a transaction of the second category does not violate the transaction category restriction.

If the system determines that approving a transaction of the second category does not violate the transaction category restriction, the method may proceed to step 370 to approve the transaction. If the system determines that approving a transaction of the first category violates the transaction category restriction, the method may proceed to step 365 to make a final declination of the transaction.

At step 365, the system may make a final declination of the transaction, based on the transaction violates the transaction category restriction. The user may need to change the transaction category restriction or otherwise seek help from a support team that manages the user account if the user still wants to use the user account to make the transaction.

At step 370, the system may approve the transaction based on the second category being authorized. The system may allow the amount of money or other credits stipulated in the transaction request to be transferred from the user account to an account associated with the merchant in the transaction.

At step 375, the system may update, based on the determination that the transaction belongs to the second category, category information of a merchant associated with the transaction. Consistent with the gas station example discussed above, the system may update, based on the photos of the gas station logo and the gas dispenser, the category indication (e.g., the MCC) associated with the smartcard reader connected with the gas dispenser. If the category indication is stored in a database, the system may communicate with the database and send the updated category indication to the database.

The system may update the category indication after the system determines that certain conditions are met. For example, the system may update the category indication if a certain number of user devices (more than 10 user devices) each uploads photos that indicate the smartcard reader is connected to a gas station instead of a grocery store. In another example, the system may update the category indication if a request to update the category indication is approved by the merchant. The system may send a request to change the category indication to a computing device associated with the merchant, and may perform the update if confirmation from the merchant's computing device is received.

Additionally or alternatively, the system may store, in a profile associated with the user account, a mapping between the second category and the identification of the merchant, so that the next time the user requests a transaction at the same merchant location, the system may approve the transaction directly even if the system has not updated the category indication of the merchant yet.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. Accordingly, the scope of the invention should be determined not by the embodiments illustrated, but by the appended claims and their equivalents.

What is claimed is:

1. A method comprising:
- receiving, by a first computing device and from a second computing device, a first message for authorization of a user request associated with a user account;
- causing, on a graphical user interface on a user device associated with the user account, output of:
  - a plurality of user selectable options, each associated with a respective category; and
  - a prompt to take one or more photos that depict a physical environment where the user request is made;
- receiving, from the user device:
  - the one or more photos; and
  - a selection, of one of the plurality of user selectable options, that indicates the user request belonging to a first category;
- providing, as input to a trained machine learning model, at least a portion of the one or more photos;
- receiving, as output from the trained machine learning model and in response to the input, an identification of one or more objects in the physical environment associated with the user request;
- identifying, based on the one or more photos and the one or more objects, one or more times of a day when the one or more photos were taken;
- determining, based on the one or more objects and the one or more times of the day, that the user request belongs to the first category; and
- transmitting, to a third computing device and based on a determination that authorizing a user request of the first category does not violate a category restriction, a second message indicating an authorization of the user request.

2. The method of claim 1, wherein the second computing device comprises a smart card reader or a point of sale (POS) device.

3. The method of claim 1, wherein the prompt comprises a second request to take the one or more photos within a time range after the prompt is sent, and wherein the providing the one or more photos is based on determining that the one or more photos were received within the time range.

4. The method of claim 1, wherein the one or more photos each depict the physical environment from a different perspective, and wherein the identification of the one or more objects identifies a first object based on different perspectives of the first object.

5. The method of claim 1, further comprising:
- receiving, from the user device, authentication information associated with the one or more photos; and
- authenticating, based on the authentication information, that the one or more photos depict the physical environment where the user request is made.

6. The method of claim 1, further comprising:
- training, using training data comprising a plurality of photos depicting a plurality of photos at different times of day, the machine learning model to output, in response to an input photo, a prediction of a time of day when the input photo was taken.

7. A first computing device comprising:
- one or more processors;
- memory storing computer instructions that, when executed by the one or more processors, configure the first computing device to:
  - receive, from a second computing device, a first message for authorization of a user request associated with a user account;
  - cause, on a graphical user interface on a user device associated with the user account, output of:
    - a plurality of user selectable options, each associated with a respective category; and
    - a prompt to take one or more photos that depict a physical environment where the user request is made;
  - receive, from the user device:
    - the one or more photos; and
    - a selection, of one of the plurality of user selectable options, that indicates the user request belonging to a first category;
  - provide, as input to a trained machine learning model, at least a portion of the one or more photos;
  - receiving, as output from the trained machine learning model and in response to the input, an identification of one or more objects in the physical environment associated with the user request; and
  - identifying, based on the one or more photos and the one or more objects, one or more times of a day when the one or more photos were taken;
  - determine, based on the one or more objects and the one or more times of the day, that the user request belongs to the first category; and
  - transmit, to a third computing device and based on a determination that authorizing a user request of the first category does not violate a category restriction, a second message indicating an authorization of the user request.

8. The first computing device of claim 7, wherein the second computing device comprises a smart card reader or a point of sale (POS) device.

9. The first computing device of claim 7, wherein the prompt comprises a second request to take the one or more photos within a time range after the prompt is sent, and wherein the instructions, when executed by the one or more processors, configure the first computing device to provide the one or more photos based on determining that the one or more photos were received within the time range.

10. The first computing device of claim 7, wherein the one or more photos each depict the physical environment from a different perspective, and wherein the identification of the one or more objects identifies a first object based on different perspectives of the first object.

11. The first computing device of claim 7, wherein the instructions, when executed by the one or more processors, further configure the first computing device to:

receive, from the user device, authentication information associated with the one or more photos; and authenticate, based on the authentication information, that the one or more photos depict the physical environment where the user request is made.

12. The first computing device of claim 7, wherein the instructions, when executed by the one or more processors, further configure the first computing device to train, using training data comprising a plurality of photos depicting a plurality of photos at different times of day, the machine learning model to output, in response to an input photo, a prediction of a time of day when the input photo was taken.

13. A non-transitory computer-readable medium storing computer instructions that, when executed, cause performance of actions comprising:

receiving, by a first computing device from a second computing device, a first message for authorization of a user request associated with a user account;

causing, on a graphical user interface on a user device associated with the user account, output of:

a plurality of user selectable options, each associated with a respective category; and a prompt to take one or more photos that depict a physical environment where the user request is made;

receiving, from the user device:

the one or more photos; and a selection, of one of the plurality of user selectable options, that indicates the user request belonging to a first category;

providing, as input to a trained machine learning model, at least a portion of the one or more photos;

receiving, as output from the trained machine learning model and in response to the input, an identification of one or more objects in the physical environment associated with the user request;

identifying, based on the one or more photos and the one or more objects, one or more times of a day when the one or more photos were taken;

determining, based on the one or more objects and the one or more times of the day, that the user request belongs to the first category; and transmitting, to a third computing device and based on a determination that authorizing a user request of the first category does not violate a transaction category restriction, a second message indicating an authorization of the user request.

14. The non-transitory computer-readable medium of claim 13, wherein the second computing device comprises a smart card reader or a point of sale (POS) device.

15. The non-transitory computer-readable medium of claim 13, wherein the prompt comprises a second request to take the one or more photos within a time range after the prompt is sent, and wherein the instructions, when executed, cause providing the one or more photos based on determining that the one or more photos were received within the time range.

16. The non-transitory computer-readable medium of claim 13, wherein the one or more photos each depict the physical environment from a different perspective, and wherein the identification of the one or more objects identifies a first object based on different perspectives of the first object.

17. The non-transitory computer-readable medium of claim 13, wherein the instructions, when executed, further cause performance of actions comprising:

receiving, from the user device, authentication information associated with the one or more photos; and authenticating, based on the authentication information, that the one or more photos depict the physical environment where the user request is made.

18. The non-transitory computer-readable medium of claim 13, wherein the instructions, when executed, further cause training, using training data comprising a plurality of photos depicting a plurality of photos at different times of day, the machine learning model to output, in response to an input photo, a prediction of a time of day when the input photo was taken.

* * * * *